United States Patent
Fujimoto et al.

(10) Patent No.: US 9,301,277 B2
(45) Date of Patent: Mar. 29, 2016

(54) WIRELESS COMMUNICATION TERMINAL, WIRELESS COMMUNICATION METHOD, AND WIRELESS COMMUNICATION SYSTEM

(71) Applicant: YAHOO JAPAN CORPORATION, Tokyo (JP)

(72) Inventors: Kenji Fujimoto, Tokyo (JP); Yasuo Tomine, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 76 days.

(21) Appl. No.: 14/140,236

(22) Filed: Dec. 24, 2013

(65) Prior Publication Data
US 2014/0247806 A1    Sep. 4, 2014

(30) Foreign Application Priority Data

Mar. 4, 2013 (JP) ................ 2013-042209

(51) Int. Cl.
*H04W 64/00* (2009.01)
*H04W 4/02* (2009.01)
*H04W 48/18* (2009.01)
*H04W 40/18* (2009.01)
*H04W 48/04* (2009.01)
*H04W 76/02* (2009.01)

(52) U.S. Cl.
CPC ............ *H04W 64/006* (2013.01); *H04W 4/027* (2013.01); *H04W 4/028* (2013.01); *H04W 40/18* (2013.01); *H04W 48/04* (2013.01); *H04W 48/18* (2013.01); *H04W 76/027* (2013.01)

(58) Field of Classification Search
CPC ......... H04W 4/02; H04W 4/028; H04W 4/24; H04W 48/18; H04W 64/00
See application file for complete search history.

(56) References Cited

U.S. PATENT DOCUMENTS

| 2003/0188006 | A1* | 10/2003 | Bard .............................. 709/232 |
| 2004/0137902 | A1* | 7/2004 | Chaskar et al. ............... 455/436 |
| 2005/0089171 | A1* | 4/2005 | Tiwari ........................... 380/270 |
| 2006/0217147 | A1* | 9/2006 | Olvera-Hernandez et al. ......................... 455/552.1 |
| 2006/0270447 | A1* | 11/2006 | Everson et al. ............ 455/552.1 |

(Continued)

FOREIGN PATENT DOCUMENTS

| JP | 2009049974 A | 3/2009 |
| JP | 2009-088920 A | 4/2009 |

(Continued)

OTHER PUBLICATIONS

Sep. 8, 2015 Office Action issued in Japanese Patent Application No. 2013-042209.
Feb. 3, 2015 Office Action issued in Japanese Application No. 2013-042209.

Primary Examiner — Ashley Shivers
(74) Attorney, Agent, or Firm — Oliff PLC

(57) ABSTRACT

A wireless communication terminal according to an embodiment includes a wireless LAN communication unit, a prediction unit which predicts a moving area of a user, an estimation unit, and a communication control unit. The estimation unit estimates a switching state of a wireless LAN connection in the wireless LAN communication unit, on the basis of a wireless LAN communication environment in the moving area predicted by the prediction unit. The communication unit restricts the wireless LAN connection in the wireless LAN communication unit, on the basis of the switching state estimated by the estimation unit.

15 Claims, 10 Drawing Sheets

(56) References Cited

U.S. PATENT DOCUMENTS

| | | | |
|---|---|---|---|
| 2006/0286988 A1* | 12/2006 | Blume | G01C 21/3679 455/456.1 |
| 2008/0165737 A1* | 7/2008 | Uppala | 370/331 |
| 2012/0166076 A1* | 6/2012 | Hardy | 701/414 |
| 2013/0208696 A1* | 8/2013 | Garcia Martin | H04W 36/32 370/331 |
| 2014/0003282 A1* | 1/2014 | Kafle | H04W 48/14 370/254 |
| 2015/0237492 A1* | 8/2015 | Huang | H04W 8/005 455/41.2 |

FOREIGN PATENT DOCUMENTS

| | | |
|---|---|---|
| JP | A-2011-166600 | 8/2011 |
| JP | 2012023506 A | 2/2012 |

\* cited by examiner

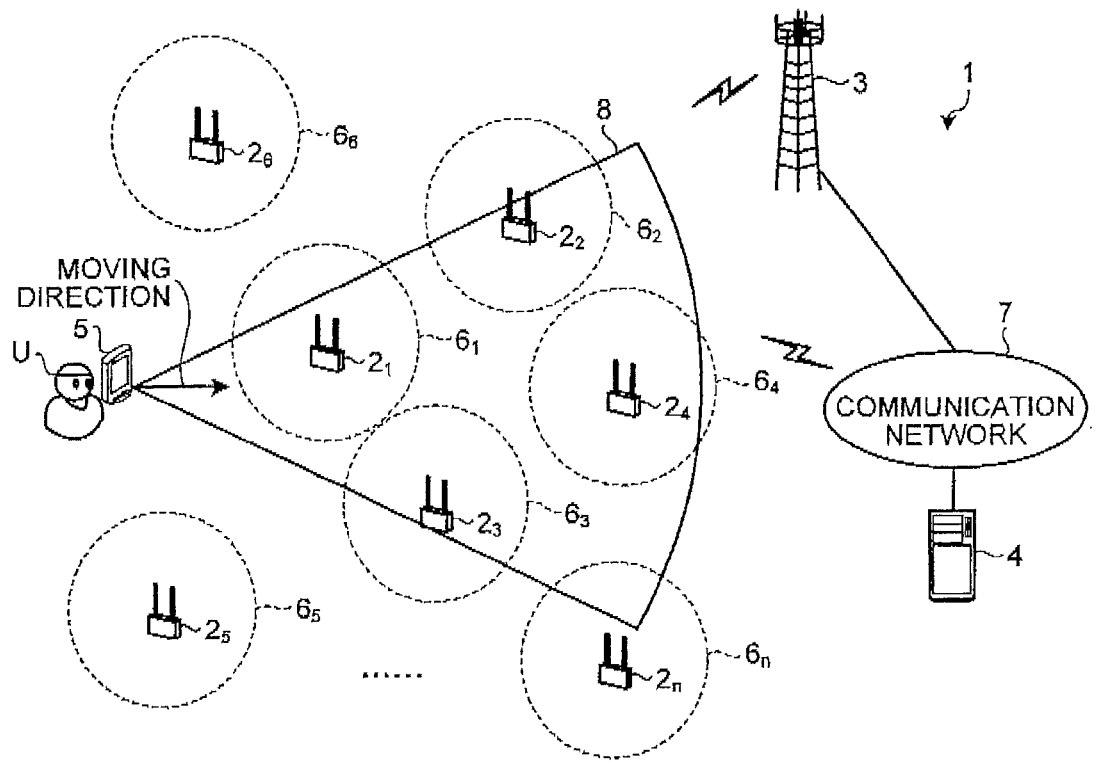
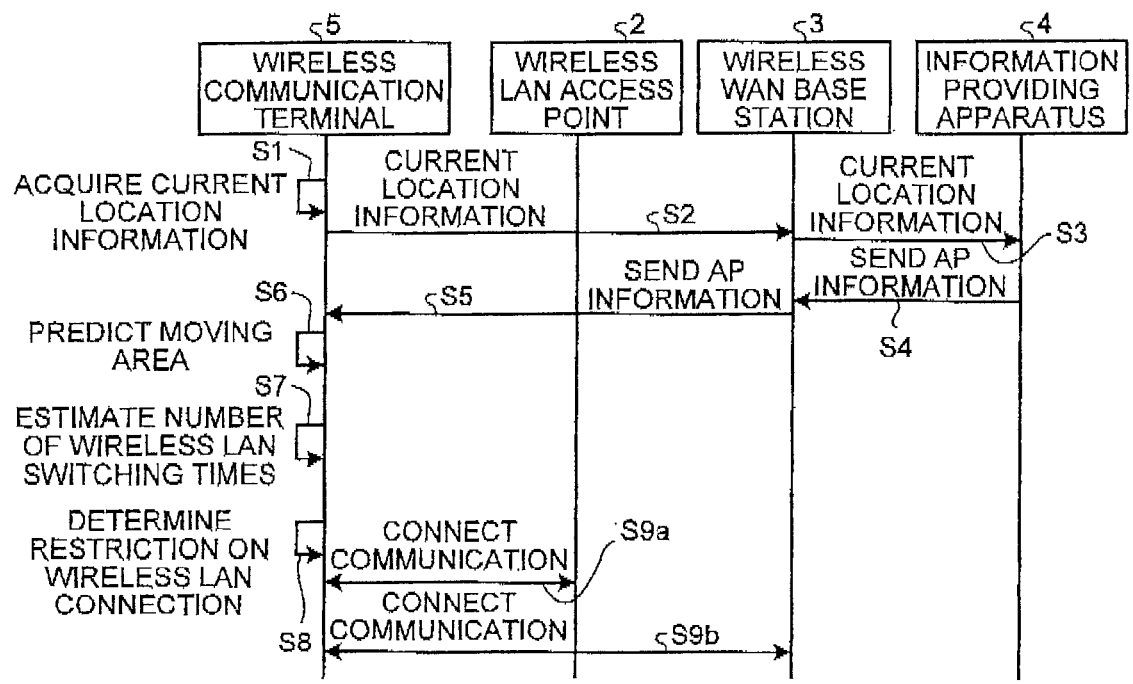

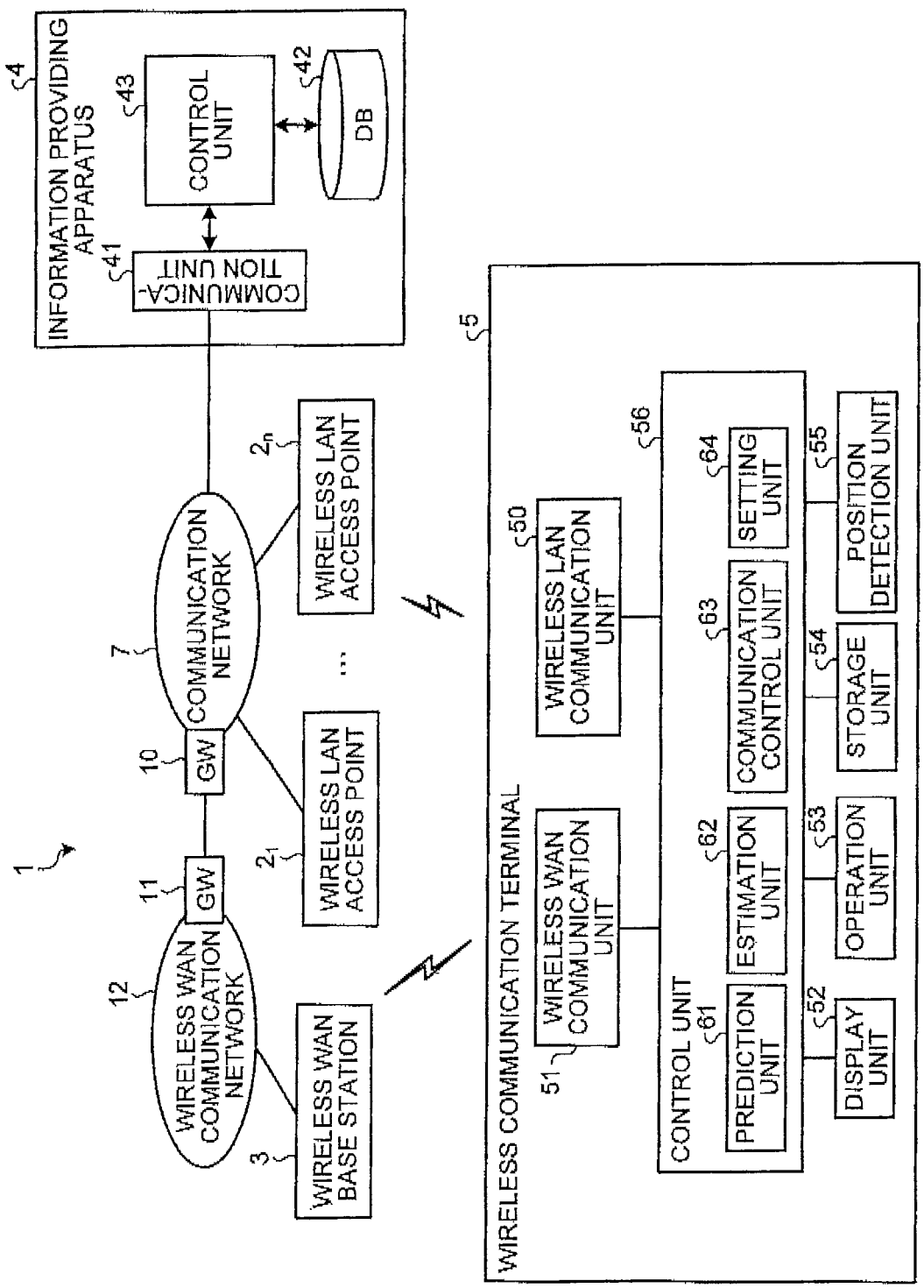

| AP-ID | INSTALLATION POSITION | WIRELESS LAN COMMUNICATION AREA |
|---|---|---|
| 101 | LATITUDE/ LONGITUDE Aa | AREA INFORMATION Ab |
| 102 | LATITUDE/ LONGITUDE Ba | AREA INFORMATION Bb |
| 103 | LATITUDE/ LONGITUDE Ca | AREA INFORMATION Cb |
| ⋮ | ⋮ | ⋮ |

FIG.10

| AP-ID | INSTALLATION POSITION | WIRELESS LAN COMMUNICATION AREA | WIRELESS LAN SERVICE PROVIDER |
|---|---|---|---|
| 101 | LATITUDE/ LONGITUDE Aa | AREA INFORMATION Ab | SERVICE PROVIDER Wa |
| 102 | LATITUDE/ LONGITUDE Ba | AREA INFORMATION Bb | SERVICE PROVIDER Wa |
| 103 | LATITUDE/ LONGITUDE Ca | AREA INFORMATION Cb | SERVICE PROVIDER Wb |
| ⋮ | ⋮ | ⋮ | ⋮ |

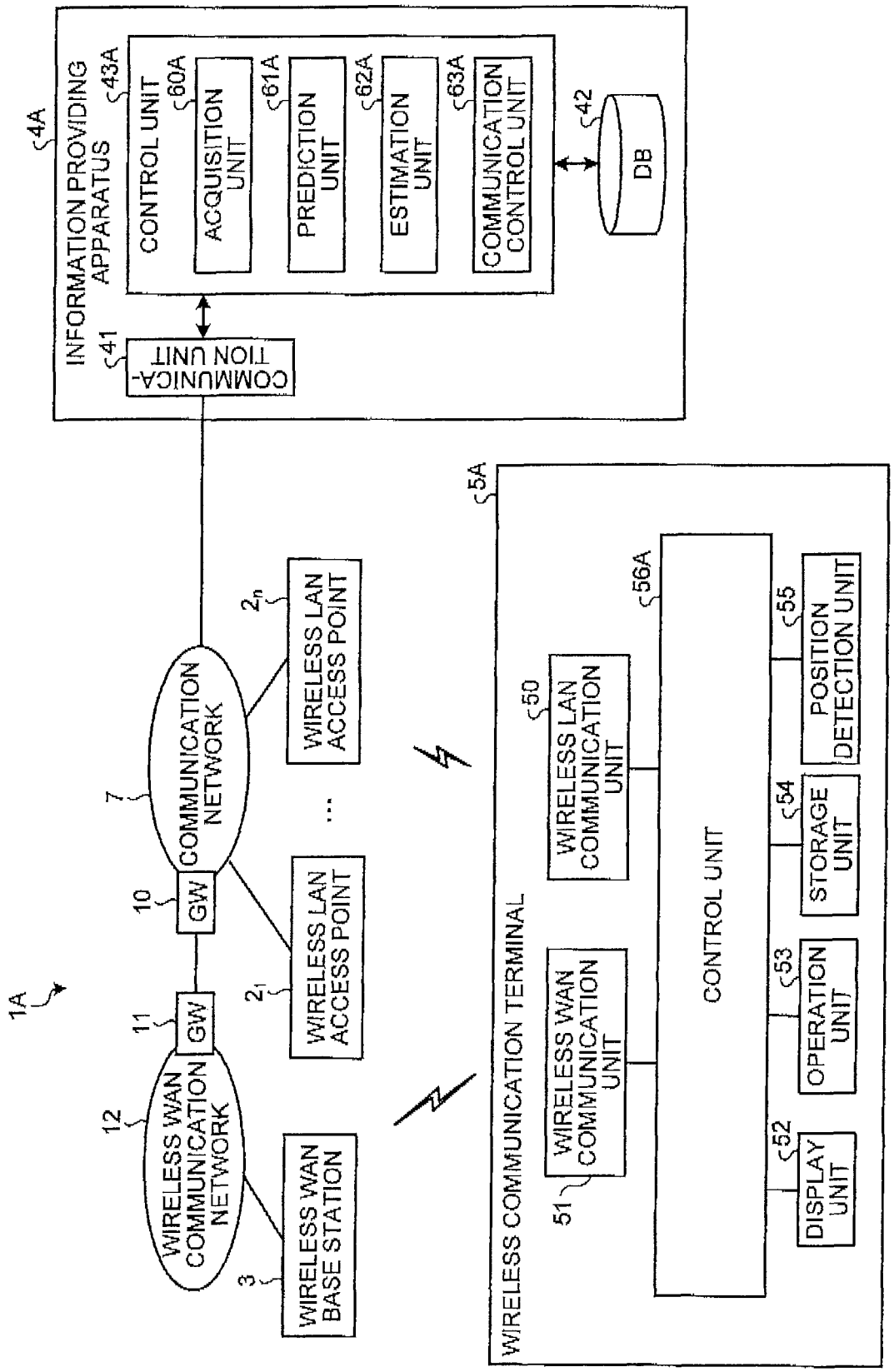

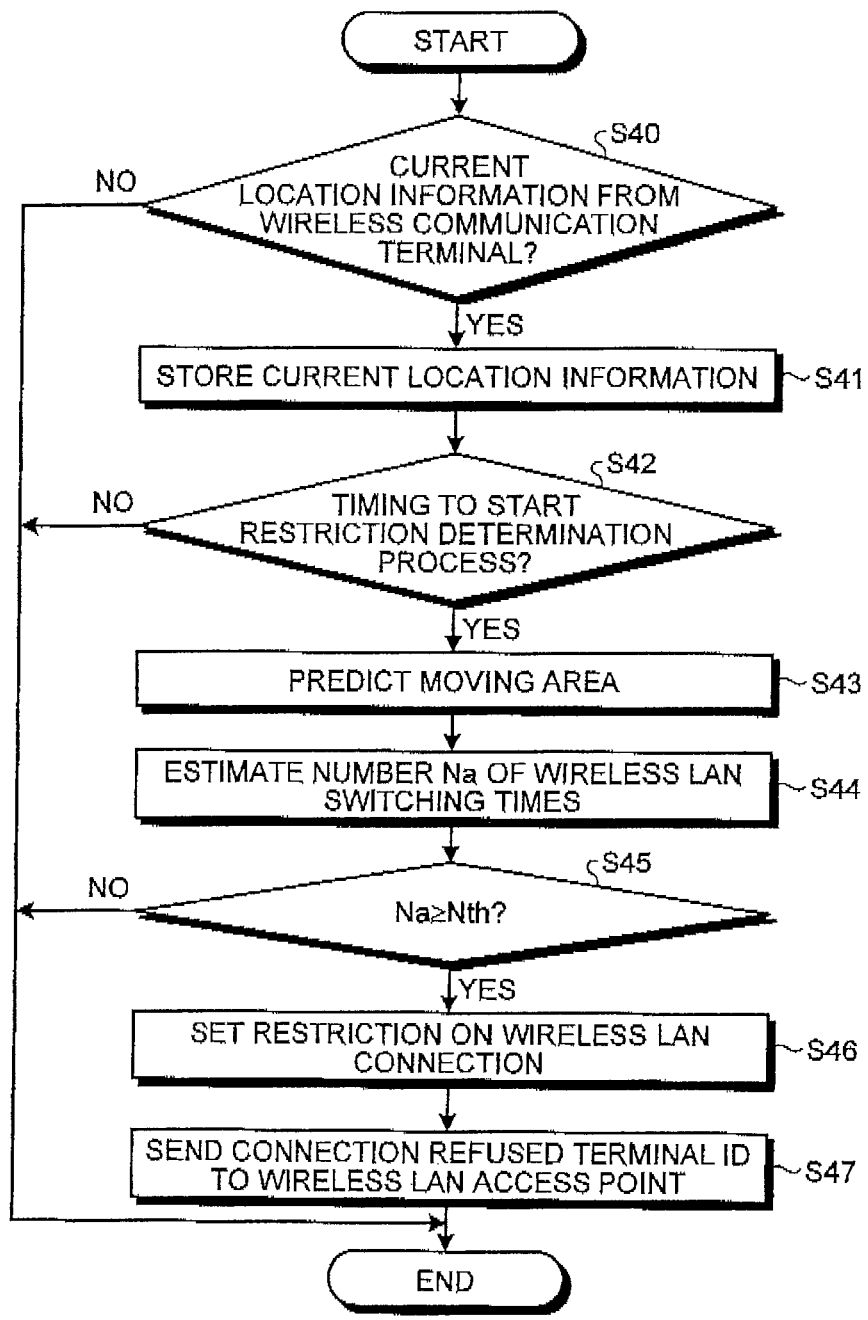

WIRELESS COMMUNICATION TERMINAL, WIRELESS COMMUNICATION METHOD, AND WIRELESS COMMUNICATION SYSTEM

CROSS-REFERENCE TO RELATED APPLICATIONS

The present application claims priority to and incorporates by reference the entire contents of Japanese Patent Application No. 2013-042209 filed in Japan on Mar. 4, 2013.

BACKGROUND OF THE INVENTION

1. Field of the Invention

The present invention relates to a wireless communication terminal, a wireless communication method, and a wireless communication system.

2. Description of the Related Art

In recent years, wireless LAN communication has rapidly come into wide use. Wireless LAN access points have been installed in various places such as stations, airports, or shops. In addition, a wireless LAN communication function has been installed, as a standard function, in cellular phone terminals that can communicate with a wireless WAN base station such as telephone communication network.

It is predicted that the wireless LAN communication, will further have come into wide use. It is also predicted that users of wireless communication terminals such as cellular phone terminals connect to the Internet through wireless WAN communication and also use the connection environment for rapid access to the Internet using the wireless LAN communication function in many places.

Generally, the wireless communication terminal can register the wireless LAN access points for performing automatic connections. When the wireless communication terminal enters a wireless LAN communication area of the registered wireless LAN access point, it automatically connects to the wireless LAN access point (for example, see Japanese Patent Application Laid-open No, 2011-166600).

However, when the user of the wireless communication terminal moves (travels), if the automatic connection is set, the connection stability may remarkably be decreased in wireless communication of the wireless communication terminal. For example, a frequent occurrence of connection and disconnection to and from the wireless LAN access points may occur.

SUMMARY OF THE INVENTION

According to an exemplary embodiment, a wireless communication terminal includes a wireless LAN communication unit, a prediction unit, an estimation unit, and a communication control unit. The prediction unit predicts a moving area of a user. The estimation unit estimates a switching state of a wireless LAN connection in the wireless LAN communication unit, on the basis of a wireless LAN communication environment in the moving area predicted by the prediction unit. The communication control unit restricts the wireless LAN connection in the wireless LAN communication unit, on the basis of the switching state estimated by the estimation unit.

The above and other objects, features, advantages and technical, and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are diagrams illustrating a configuration and operation of a wireless communication system according to a first embodiment;

FIG. 2 is a diagram illustrating a specific configuration example of an information providing system according to the first embodiment;

FIG. 10 is a diagram illustrating an example of an AP information table stored in a DB of the information providing apparatus;

FIG. 12 is a diagram illustrating a configuration example of an information providing system according to a second embodiment; and FIG. 13 is a flowchart of an information process in an information providing apparatus illustrated in FIG. 12.

DETAILED DESCRIPTION OF THE PREFERRED EMBODIMENTS

Figures 3, 4:
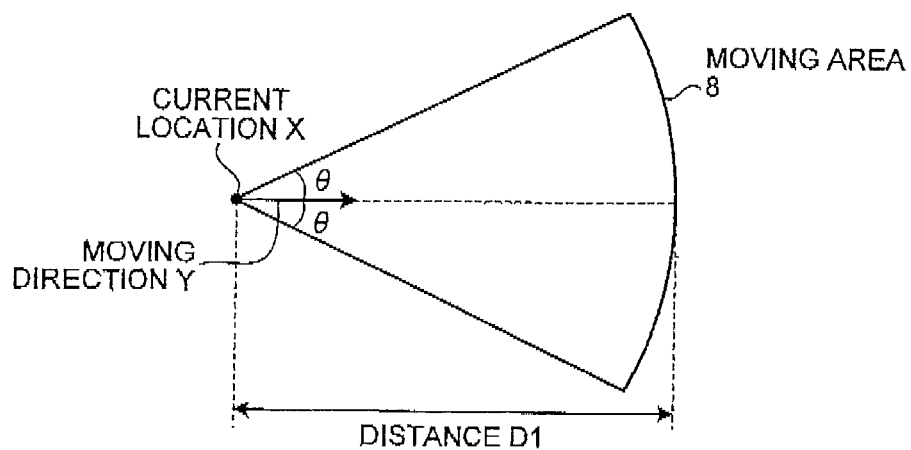
FIG. 3 is a diagram illustrating an example of an AP information table stored in a database of an information providing apparatus.
FIG. 4 is a diagram illustrating an example of a moving area which is predicted by a prediction unit when a moving speed is equal to or greater than a threshold value.

Descriptions will now be made to a wireless communication terminal, a wireless communication method, and a wireless communication system, according to embodiments of the present disclosure, with reference to the drawings. The embodiments are not to limit the wireless communication terminal, the wireless communication method, and the wireless communication system, according to the present disclosure. In the following descriptions, a database is referred to as a DB.

1. First Embodiment

1.1. Wireless Communication System

FIG. 1 is a diagram illustrating a configuration and an operation of a wireless communication system according to a first embodiment. As illustrated in FIG. 1A, a wireless communication system 1 according to the first embodiment includes wireless LAN (Local Area Network) access points $2_1$ to $2_n$, a wireless WAN (Wide Area Network) base station 3, an information providing apparatus 4, and a wireless communication terminal 5.

The wireless LAN access points $2_1$ to $2_n$ (hereinafter, may be referred to as a wireless LAN access point 2 collectively)

have wireless LAN communication areas $6_1$ to $6_n$ (hereinafter, may be referred to as a wireless LAN communication area 6 collectively), and are connected to a communication network 7 by wire or wirelessly. The communication network 7 is an IP (Internet Protocol) network, for example, the Internet. The wireless LAN may, for example, be a wireless LAN defined in IEEE 802.11, but is not limited to the wireless LAN of this standard.

The wireless WAN base station 3 is connected to a cellular phone communication network (not illustrated) as a wireless WAN communication network, and can perform communication with an apparatus connected to the communication network 7 through the cellular phone communication network. The wireless WAN communication network connected to the wireless WAN base station 3 may be a network dedicated to data communication, in this case, the wireless WAN base station 3 is a wireless base station for the network dedicated to data communication.

The wireless communication terminal 5 has a wireless WAN communication unit, and can access a server (for example, information providing apparatus 4 or web server) connected to the communication network 7 from the wireless WAN base station 3 through the wireless WAN communication network. The wireless communication terminal 5 has a wireless LAN communication unit, and can access a server connected to the communication network 7 even through the wireless LAN access point 2 in the wireless LAN communication area 6 of the wireless LAN access point 2.

The wireless communication terminal 5 has an automatic connection function for the wireless LAN access point 2. When the terminal enters the wireless LAN communication area 6, it automatically performs connection through wireless LAN communication with the wireless LAN access point 2 corresponding to this wireless LAN communication area 6.

If a user U of the wireless communication terminal 5 moves in a state where the automatic connection function of the wireless communication terminal 5 is ON, the user may possibly and repeatedly enter and leave the wireless LAN communication area 6. In this case, the wireless communication terminal 5 may repeat connection and disconnection of the communication with the wireless LAN access point 2, thus remarkably lowering the connection stability.

Hence, the wireless communication terminal 5 predicts a moving area of the user U, and restricts connection of the wireless LAN communication on the basis of the estimation result. Descriptions will now specifically be made to an operation of a control unit of the wireless communication terminal 5, with reference to a sequence diagram illustrated in FIG. 1B.

As illustrated in FIG. 1B, the control unit of the wireless communication terminal 5 acquires information regarding the current location (Step S1), and sends the acquired information regarding the current location to the information providing apparatus 4 (Step S2, S3). The wireless communication terminal 5 has a position detection unit which acquires information regarding the current location, while the control unit of the wireless communication terminal 5 acquires information regarding the current location from the position detection unit.

This sending of the current location information from the wireless communication terminal 5 to the information providing apparatus 4 is performed through the wireless LAN access point 2, when the wireless communication terminal 5 is connected to the wireless LAN access point 2, and is performed through the wireless WAN base station 3, when the wireless communication terminal 5 is not connected to the wireless LAN access point 2.

Upon acquisition of the current location information from the wireless communication terminal 5, the information providing apparatus 4 acquires position information of the wireless LAN access point 2 existing in a predetermined range including a position represented in the current location information, from an internal DB, and sends the information to the wireless communication terminal 5 as AP information (Step S4, S5).

The sending of the AP information from the information providing apparatus 4 to the wireless communication terminal 5 is performed along a route that the wireless communication terminal 5 sends the current location information. For example, when the wireless communication terminal 5 sends the current location information through the wireless WAN base station 3, the AP information is sent to the wireless communication terminal 5 through the wireless WAN base station 3.

The control unit of the wireless communication terminal 5 predicts a moving area 8 (see FIG. 1A) of the user U (Step S6). The moving area 8 is an area within which the user U can move (travel) during, for example, a predetermined period of time Ta. The wireless communication terminal 5 determines a moving direction or moving speed of the user U on the basis of the information regarding the current location acquired, for example, by the position detection unit, and predicts the moving area 8 on the basis of the determination result.

The control unit of the wireless communication terminal 5 estimates how many times switching of the wireless LAN connection is performed in the wireless communication terminal 5 when the user U moves in the moving area 8, on the basis of the AP information acquired from the information providing apparatus 4 (Step S7).

The control unit of the wireless communication terminal 5 can estimate a switching state (hereinafter, may be referred to as a wireless LAN switching state) of wireless LAN connection, on the basis of, for example, the number or distribution of the wireless LAN access points existing in the moving area 8. The control unit of the wireless communication terminal 5 estimates the number of switching times of the wireless LAN connection (hereinafter referred to as the number of wireless LAN switching times), as a wireless LAN switching state. However, the control unit may also estimate the wireless LAN switching interval or a wireless LAN switching frequency. The wireless LAN switching interval represents a time interval for switching the wireless LAN connection. The wireless LAN switching frequency represents a switching frequency of the wireless LAN connection per unit time. The control unit of the wireless communication terminal 5 may also estimate the wireless LAN switching state, on the basis of the number or shapes of areas excluded from the wireless LAN communication areas 6 of the wireless LAN access point 2 inside the moving area 8.

On the basis of the estimated wireless LAN switching state, the control unit of the wireless communication terminal 5 determines whether to restrict the wireless LAN connection (Step S8). The control unit of the wireless communication terminal 5 does not restrict the wireless LAN connection, when, for example, the number of wireless LAN switching times in the moving area 8 is lower than a preset threshold value. In this case, the control unit of the wireless communication terminal 5 performs wireless LAN connection with the wireless LAN access point $2_1$, when the wireless communication terminal 5 enters the wireless LAN communication area $6_1$ in the moving area 8 (Step S9a). Thus, the control unit of the wireless communication terminal 5 can access a server connected to the communication network 7, through the wireless LAN access point 2.

When the number of wireless LAN switching times in the moving area 8 is equal to or greater than the preset threshold value, the wireless LAN connection is restricted. Thus, the control unit of the wireless communication terminal 5 does not perform the wireless LAN connection with the wireless LAN access point 21, but performs the wireless WAN connection with the wireless WAN base station 3, even when the wireless communication terminal 5 enters, for example, the wireless LAN communication area 6, in the moving area 8 (Step S9*b*). The control unit of the wireless communication terminal 5 accesses a server connected to the communication network 7 through the wireless WAN base station 3.

The control unit of the wireless communication terminal 5 can also restrict the wireless LAN connection on the basis of the wireless LAN switching intervals, in place of the number of wireless LAN switching times, or in addition to the number of wireless LAN switching times. For example, the control unit of the wireless communication terminal 5 restricts the wireless LAN connection, when the wireless LAN switching interval is estimated, and also when a percentage of relatively short wireless LAN switching intervals is equal to or greater than a predetermined threshold value. The control unit does not restrict the wireless LAN connection, when the percentage of relatively short wireless LAN switching intervals is lower than the predetermined threshold value.

In this manner, the wireless communication terminal 5 according to the first embodiment restricts the wireless LAN connection, on the basis of the estimated number of wireless LAN switching times in the moving area 8 of the user U. Thus, it is possible to prevent a frequent occurrence of the connection and disconnection between the wireless communication terminal 5 and the wireless LAN access point 2, and to prevent a decrease in the connection stability of the wireless communication in the wireless communication terminal 5.

The wireless communication terminal 5 according to the first embodiment can restrict the wireless LAN connection, on the basis of the wireless LAN switching intervals. This enables to prevent the switching of the wireless LAN connection in a short period of time and to prevent a decrease in the connection stability of the wireless communication in the wireless communication terminal 5, after the wireless communication terminal 5 connects to the wireless IAN access point 2.

Even when the wireless LAN connection is restricted on the basis of the wireless LAN switching state, the wireless communication terminal 5 can access a server connected to the communication network 7, through communication connection with the wireless WAN base station 3 using the wireless WAN communication. Descriptions will further specifically be made to a specific configuration and a specific process of the wireless communication system 1, with reference to the illustrations.

1.2. Specific Configuration of Wireless Communication System 1

Descriptions will now be made to an example of a specific configuration of the wireless communication system 1 according to the first embodiment, using FIG. 2. FIG. 2 is a diagram illustrating an example of a specific configuration of the wireless communication system 1 according to the first embodiment.

As illustrated in FIG. 2, the wireless communication system 1 includes the plurality of wireless LAN access points 2$_1$ to 2$_n$, the wireless WAN base station 3, the information providing apparatus 4, and the wireless communication terminal 5. The wireless LAN access point 2 and the information providing apparatus 4 are connected to each other through the communication network 7. The information providing apparatus 4 can provide various information items from the wireless LAN access point 2 to the wireless communication terminal 5 through the communication network 7.

The wireless WAN base station 3 is connected to a wireless WAN communication network 12, and is connected also to the communication network 7 through gateway servers 10 and 11. The information providing apparatus 4 can send information to the wireless communication terminal 5 from the wireless WAN base station 3 connected to the wireless WAN communication network 12 through the communication network 7. As described above, the wireless WAN communication network 12 is, for example, a cellular phone communication network or a network dedicated to data communication.

Descriptions will now be made to contents of a specific configuration and a specific process of the information providing apparatus 4 and the wireless communication terminal 5, with reference to the illustrations.

1.2.1. Configuration of Information Providing Apparatus 4

Descriptions will now be made to a specific configuration of the information providing apparatus 4 according to this embodiment. As illustrated in FIG. 2, the information providing apparatus 4 has a communication unit 41, a DB 42, and a control unit 43.

The communication unit 41 is an interface, such as a NIC (Network Interface Card). The control unit 43 sends/receives various information items between the wireless LAN access point 2, the wireless WAN base station 3, and the wireless communication terminal 5, through the communication unit 41 and the communication network 7.

The DB 42 is a memory unit, for example, a hard disk, RAM (Random Access Memory), a semiconductor memory device (flash memory), or an optical disk. This DB 42 stores an AP information table and program data, for example, a wireless LAN communication control application (hereinafter referred to as a wireless LAN communication control application).

FIG. 3 is a diagram illustrating an example of the AP information table stored in the DB 42. As illustrated in FIG. 3, the AP information table is information including "Installation Position" and "Wireless LAN Communication Area", in association with each "AP-ID".

The "AP-ID" is identification information of the wireless LAN access point 2, and information assigned to each wireless LAN access point 2. The "Installation Position" is information about the installation position of the wireless LAN access point 2. In the example illustrated in FIG. 3, set information represents the latitude/longitude of the installation position of the wireless LAN access point 2, as the "Installation position". "Wireless LAN communication Area" represents the wireless LAN communication area 6 of the wireless LAN access point 2, and represents, for example, the latitude/longitude of the wireless LAN communication area 6.

The control unit 43 is realized by an integrated circuit, such as an ASIC (Application Specific Integrated Circuit), an FPGA (Field Programmable Gate Array). The control unit 43 executes various functions, by executing programs stored in an inner memory unit using the RAM as a working area under the control of a CPU (Central Processing Unit) or MPU (Micro Processing Unit).

In response to an information transmission request from the wireless communication terminal 5 through the communication unit 41, the control unit 43 acquires information about the wireless LAN access point 2 from the AP information table, and sends the acquired information to the wireless communication terminal 5 as a transmission request source through the communication unit 41.

The information transmission request sent from the wireless communication terminal 5 includes current location information. The control unit 43 sends information as AP information to the wireless communication terminal 5 as an information transmission request source. This AP information represents the installation location of the wireless LAN access point 2 and the wireless LAN communication area 6. The wireless LAN access point 2 exists in a predetermined range from the current location of the wireless communication terminal 5 represented in the current location information included in the information transmission request.

In response to a transmission request for program data of a wireless LAN communication control application from the control unit 43, data of the wireless LAN communication control application is acquired from the DB 42, and is sent to the wireless communication terminal 5 as a request source.

1.2.2. Configuration of Wireless Communication Terminal 5

As illustrated in FIG. 2, the wireless communication terminal 5 has a wireless LAN communication unit 50, a wireless WAN communication unit 51, a display unit 52, an operation unit 53, a storage unit 54, a position detection unit 55, and a control unit 56. The wireless LAN communication unit 50 sends/receives information to/from the wireless LAN access point 2. The wireless WAN communication unit 51 sends/receives information to/from the wireless WAN base station 3.

The display unit 52 is a touch-panel display. The user U of the wireless communication terminal 5 can operate a screen displayed on the display unit 52 in accordance with a touch operation by a finger tap on the screen of the display unit 52. This display unit 52 is a small-sized LCD Liquid Crystal Display) or an organic EL display.

The operation unit 53 has a keyboard (including keys for inputting letters, numerals, spaces, an enter key, and arrow keys) and a power button.

The storage unit 54 is a semiconductor memory device (for example, RAM, flash memory), or a memory unit (for example, a hard disk or an optical disk). This storage unit 54 stores various programs or setting values. The program stored in the storage unit 54 is a wireless LAN communication control application acquired from an OS (Operating System) or the information providing apparatus 4. The wireless LAN communication control application may be acquired from a, server other than the information providing apparatus 4.

The position detection unit 55 has a GPS (Global Positioning System) receiving function, and acquires information regarding the current location of the wireless communication terminal 5. The information regarding the current location represents the longitude/latitude, or may represent a corresponding address.

The control unit 56 is realized by an integrated circuit, for example, an ASIC or FPGA. The control unit realizes or executes functions or actions of an information process (described later), by executing programs stored in the storage unit 54 using inner RAM as a working area under the control of the CPU or MPU.

The control unit 56 executes the wireless LAN communication control application whose program data is stored in the storage unit 54, thereby functioning as a prediction unit 61, an estimation unit 62, a communication control unit 53, and a setting unit 64. The configuration of the control unit 56 is not limited to the above configuration, and any other configuration may be applied as long as an information process (described later) can be performed thereby.

Prediction Unit 61

The prediction unit 61 predicts a possible area in which the user U of the wireless communication terminal 5 may possibly move in a predetermined period of time Ta, as the moving area 8 (see FIG. 1A). This moving area 8 is predicted on the basis of, for example, the moving direction Y and the moving speed Va of the user U.

Specifically, the prediction unit 61 obtains the moving direction Y and the moving speed Va of the user U, on the basis of a change of the current location of the wireless communication terminal 5 which is detected by the position detection unit 55. For example, the prediction unit 61 obtains the moving speed Va of the user in accordance with how much the current location of the wireless communication terminal 5 detected by the position detection unit 55 has changed in a predetermined period of time. The prediction unit 61 obtains also the moving direction Y of the user U in accordance with to which direction the current location of the wireless communication terminal 5 detected by the position detection unit 55 has changed in a predetermined period of time.

When the moving speed of the user U is equal to or greater than a predetermined threshold value Vth, a prediction is made on a fan-shaped area spreading out toward the forward direction of the user U, as the moving area 8. For example, as illustrated in FIG. 4, the prediction unit 61 predicts, as the moving area 8, the fan-shaped area with the current location X of the user U, as an origin, and a distance D1 and an angle θ in accordance with the moving speed Va of the user. FIG. 4 is a diagram illustrating an example of the moving area 8 predicted by the prediction unit 61, when the moving speed Va of the user U is equal to or greater than the predetermined threshold value Vth. In FIG. 4, the angle θ is an angle with respect to the moving direction Y of the user U.

Figure 5:
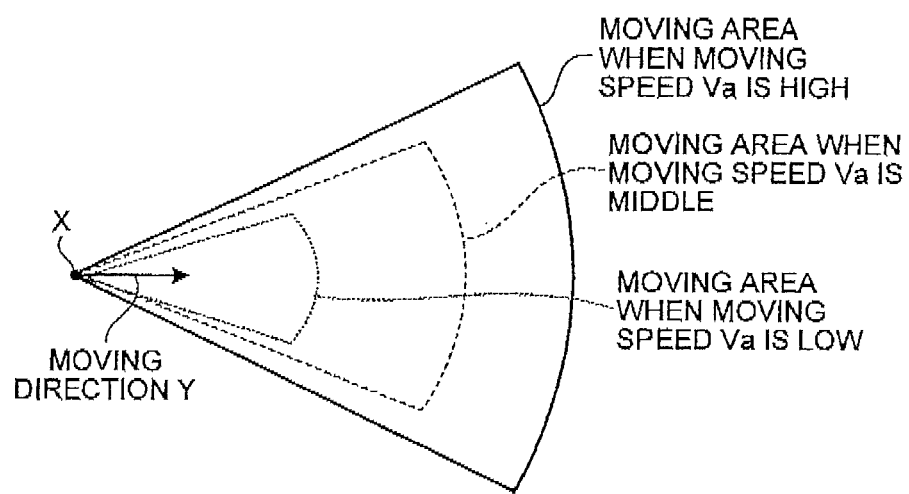
FIG. 5 is a diagram illustrating the relationship between the moving speed of a user, a distance, and an angle.

FIG. 5 is a diagram illustrating the relationship between the moving speed Va of the user U, the distance D1, and the angle θ. As illustrated in FIG. 5, the prediction unit 61 sets a large distance D and a large angle θ, as the moving speed Va of the user U is high. For example, $D1=Kd1*Va$, $\theta=Kang*Va$. "Kd1" and "Kang" are coefficients. Accordingly, as the moving speed Va of the user U is high, the possible area where the user U moves spreads out. Thus, the prediction unit 61 predicts the moving area 8 with a size corresponding to the moving speed Va of the user U.

Figure 6:
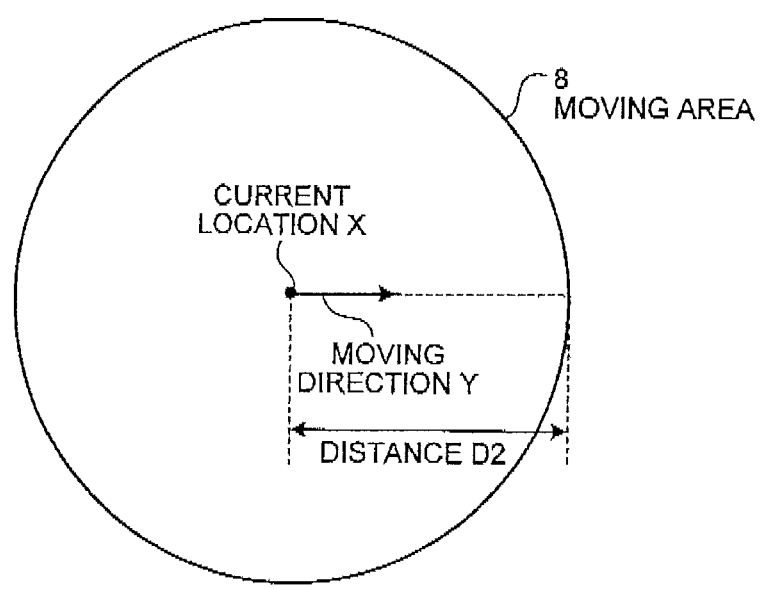
FIG. 6 is a diagram illustrating an example of a moving area predicted by a prediction unit when the moving speed of the user is lower than a predetermined threshold value.

When the moving speed Va of the user U is lower than the predetermined threshold value Vth, the prediction unit 61 predicts a circular area with a distance D1 as a radius as the moving area 8, with the current location X of the user U as a center, as illustrated in FIG. 6. FIG. 6 is a diagram illustrating an example of the moving area 8 predicted by the prediction unit 61, when the moving speed Va of the user U is lower than the predetermined threshold value Vth.

When the user U is in a stopped state or nearly a stopped state, in many cases, it is not clear to which direction the user U moves. Thus, the prediction unit 61 predicts the circular area with the current location X of the user U as its center, as the moving area 8. Note that the distance D2 is obtained by, for example, $D2=Kd2*va$, where "Kd2" is a coefficient.

The prediction unit 61 can also set the circular moving area 8 in a manner that a position deviated from the center of the moving area 8 is the current location X of the user U. In this case, the prediction unit 61 sets the circular moving area 8 in a manner that a position deviated into a direction opposite to the last moving direction of the user U becomes the current location X of the user U.

When the user U is in a stopped state or nearly a stopped state, the prediction unit 61 can determine a circular or elliptical area, as the moving area 8, which has a long distance in a direction with a high probability of predicted movement and a short distance in a direction with a low probability of predicted movement.

The prediction unit 61 can also predict the moving area 8 in a manner that the area gets close to a fan-shaped form as the moving speed Va is high, and gets close to a circular form as the moving speed Va is low.

The prediction unit 61 can also change the distances D1 and D2, the angle θ and the area form, in accordance with attributes of the current location. The attributes of the current location include, for example, a shopping district, an amusement park, a shopping center, and a station building. Accordingly, if the distances D1 and D2, the angle θ, and the area form are changed in accordance with the attributes of the current location, thereby predicting the moving area 8 with high accuracy.

Estimation Unit 62

The estimation unit 62 estimates the number Na of switching times (hereinafter referred to as a number Na of wireless LAN switching times) of the wireless LAN connection in the wireless LAN communication unit 50, as a switching state of the wireless LAN connection in the wireless LAN communication unit 50, on the basis of information regarding the wireless LAN access point 2 existing in the moving area 8. The estimation of the number Na of wireless LAN switching times by the estimation unit 62 is performed in any of a, first to third estimation modes.

The estimation unit 62 estimates the number Na of wireless LAN switching times, on the basis of the number of wireless LAN access point 2 existing in the moving area 8, when the first estimation mode is set. Information regarding the wireless LAN access point 2 existing in the moving area 8 is included in information which is sent from the information providing apparatus 4 in response to an information transmission request. The estimation unit 62 obtains the number of wireless LAN access point 2 existing in the moving area 8, on the basis of the information acquired from the information providing apparatus 4.

The estimation unit 62 acquires information regarding the current location from the position detection unit 55, and sends an information transmission request including the current location information to the information providing apparatus 4 through the wireless LAN communication unit 50 or the wireless WAN communication unit 51, thereby acquiring information from the information providing apparatus 4.

After the estimation unit 62 obtains the number of wireless LAN access point 2 existing in the moving area 8, it obtains a ratio (hereinafter referred to as a service area/non-service area ratio Ra) of the wireless LAN communication area 6 and a wireless LAN non-communication area in the moving area 8.

The service area/non-service area ratio Ra is obtained by dividing a value by an area Smv of the moving area 8. This value is obtained by multiplying a preset area Sap of the wireless LAN communication area 6 by the number Na of wireless LAN access point 2. An equation is given as Ra=(Sap*Na)/Smv*Tav, in which an average value Tav of a weighted value is considered. This weighted value is obtained on the basis of a positional relationship between, the moving area 8 and each wireless LAN access point 2.

The estimation unit 62 estimates the number Na of wireless LAN switching times, on, the basis of the service area/non-service area ratio Ra. For example, the estimation unit 62 estimates the number Na of wireless LAN switching times, on the basis of a function f(Ra) with "Ra" as a parameter.

The function may be expressed, for example, as f(Ra)=Ra*Ka. "Ka" is a coefficient. This equation has been given only by way of example, and any other different arithmetic formulas may be given, as long as the number Na of wireless LAN switching times can be estimated.

When the second estimation mode is set, the estimation unit 62 estimates the number Na of wireless LAN switching times, on the basis of the number and shapes of areas (hereinafter referred to as non-service areas), which are not the wireless LAN communication areas 6 of the wireless LAX access point 2 in the moving area 8.

Information regarding the wireless LAN communication area 6 existing in the moving area 8 is included in information which is sent from the information providing apparatus 4 in response to an information transmission request. The estimation unit 52 obtains the number and shapes of non-service areas in the moving area 8, on the basis of the information acquired from the intonation providing apparatus 4.

Figure 7:
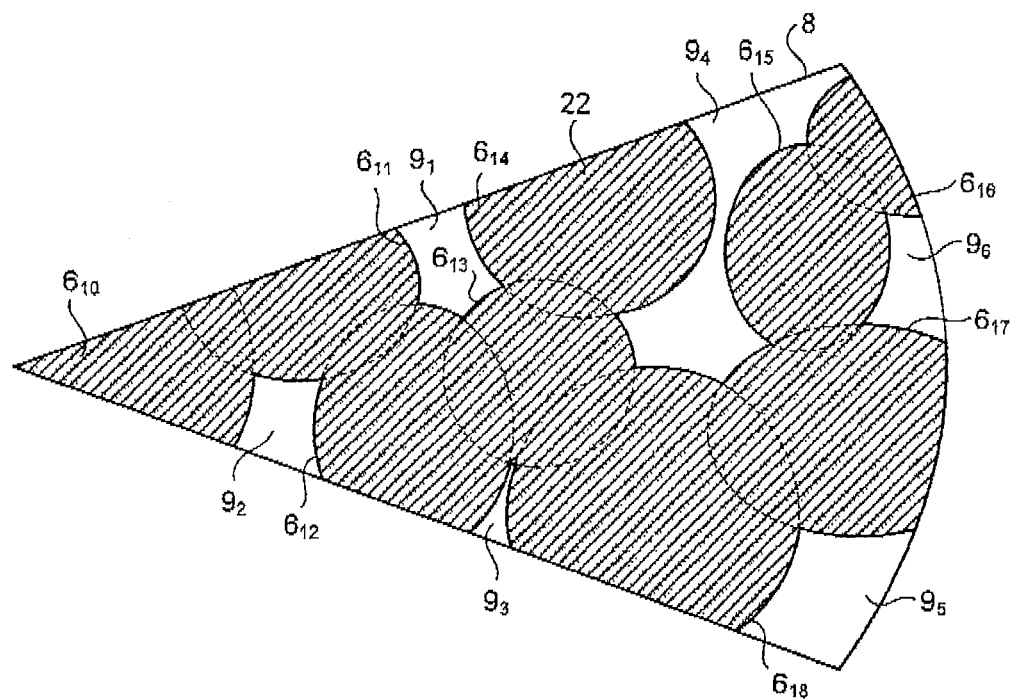
FIG. 7 is a diagram illustrating an example of service areas and non-service areas in the moving area.

FIG. 7 is a diagram illustrating en example of service areas and non-service areas in the moving area 8. The moving area 8 illustrated in FIG. 7 includes service area 22 including wireless LAN communication areas $6_{10}$ to $6_{18}$ and non-service areas $9_1$ to $9_6$. The estimation unit 62 obtains the number Nb and shapes of the non-service areas $9_1$ to $9_6$ (hereinafter may be referred to as a non-service area 9 collectively), on the basis of area information acquired from the information providing apparatus 4.

The estimation unit 62 estimates the number Na of wireless LAN switching times, using a function f(Nb, G), with the number Nb and the complexity U of the shapes of the non-service area 9.

The complexity G of the shapes of the non-service area 9 becomes large, as the width of the moving direction of the user U is large. In addition, the complexity G becomes large, as the number of tops is large. The method for obtaining the complexity G is not limited to this, and any other method may be applied. The total area Sb of the non-service area 9 may be a parameter.

The above function may be expressed, for example, as f(Nb, G)=Nb*G*Kb. "Kb" is a coefficient. This equation has been given only by way of example, and any other arithmetic formulas may be given, as long as the number Na of wireless LAN switching times can be estimated on the basis of the number Nb of the non-service areas 9 and the complexity G of the shapes.

The information acquired by the estimation unit 62 from the information providing apparatus 4 may be information (see FIG. 3) regarding the installation position of the wireless LAN access point 2, in place of the area information. In this case, the estimation unit 62 may set a range with a predefined effective radius in which the installation position of the wireless LAN access point 2 is the center thereof, as the wireless LAN communication area 6.

When the third estimation mode is set, the estimation unit 62 estimates the number Na of wireless LAN switching times, on the basis of a service area/non-service area map of the moving area 8. The service area/non-service area map is a map representing the service area 22 and the non-service area 9 in the moving area 8. This service area/non-service area map can be obtained by the same process as that in the second estimation mode.

Figure 8:
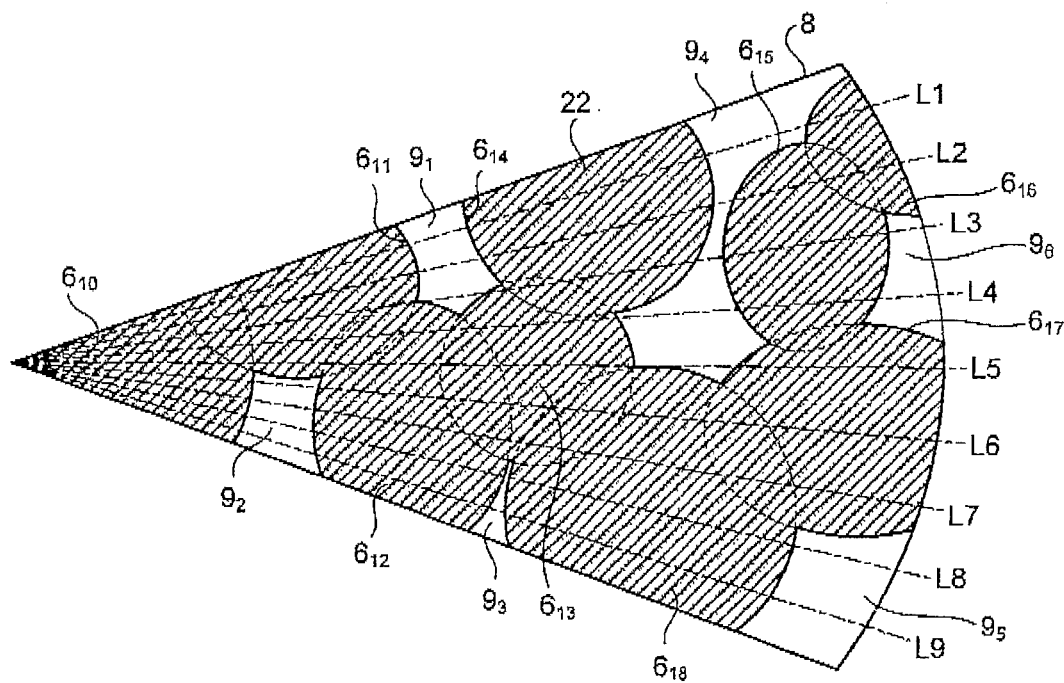
FIG. 8 is a diagram illustrating a service/non-service map and a moving route.

The estimation unit 62 obtains a plurality of routes to be presumed as moving routes of the user U in the moving area 8, and obtains also a number Nax (x is a natural number) of wireless LAN switching times along each of the routes. FIG. 8 is a diagram illustrating the service area/non-service area map and the moving routes.

When the service area/non-service area map is in a state illustrated in FIG. 8, the estimation unit 62 obtains, for example, routes L1 to L9 as the moving routes of the user U, and obtains also numbers Na1 to Na9 of wireless LAN switching times along the routes L1 to L9.

For example, when the user U moves along the route L1, the user passes through four wireless LAN communication areas $6_{10}$, $6_{11}$, $6_{14}$, $6_{16}$. Thus, the estimation unit 62 sets the number Na1 of wireless LAN switching times to "4". When the user U moves along the route L4, the user passes through five wireless LAN communication areas $6_{10}$, $6_{11}$ to $6_{13}$, and $6_{15}$. The estimation unit 62 sets the number Na4 of wireless LAN switching times to "5".

The estimation unit 62 sets an average value of the numbers Na1 to Na9 of wireless LAN switching times, as the number Na of wireless LAN switching times. When the numbers Na1 to Na9 of wireless LAN switching times are "4", "5", "4", "5", "5", "5", "5", "5", "3", and "3", the number Na of wireless LAN switching times is "4.33".

When the wireless communication terminal 5 has a roaming function, it is possible to obtain the number Na of wireless LAN switching times, on the basis of the number of non-service area 9 through which the user U passes along the moving route.

For example, when the user U moves along the route L1, the user passes through the two separated non-service areas $9_1$ and $9_4$. Thus, the estimation unit 62 sets the number Na1 of wireless LAN switching times to "3". In addition, when the user U moves along the route L4, the user passes through one non-service area $9_4$. Thus, the estimation unit 62 sets the number Na4 of wireless LAN switching times to "2".

The estimation unit 62 sets an average value of, for example, the numbers Na1 to Na9 of wireless LAN switching times, as the number Na of wireless LAN switching times. When the numbers Na1 to Na9 of wireless LAN switching times are "3", "3", "4", "3", "2", "2", "2", "4", and "4", the number Na of wireless LAN switching times is "3".

Accordingly, the estimation unit 62 obtains the number Na of wireless LAN switching times in any of the first to third estimation modes. However, the unit may obtain the number Na of wireless LAN switching times in accordance with any other method on the basis of information about the wireless LAN access point 2.

The estimation unit 62 has acquired the information about the wireless LAN access point 2 from the information providing apparatus 4. However, the information may be included, in advance in program data of the wireless LAN communication control application. In this case, the control unit 56 stores the information about the wireless LAN access point 2 in, the storage unit 54, by executing the wireless LAN communication control application. The estimation unit 62 obtains the number Na of wireless LAN switching times on the basis of the information about the wireless LAN access point 2 stored in the storage unit 54.

The estimation unit 62 may estimate a time interval Ts (hereinafter referred to as a wireless LAN switching intervals Ts) of switching the wireless LAN connection in the wireless LAN communication unit 50 or a switching frequency Fs (hereinafter referred to as a wireless LAN switching frequency Fs) per unit time, as switching states of the wireless LAN connection in the wireless LAN communication unit 50. The estimation unit 62 can estimate the distribution of the wireless LAN switching intervals Ts.

The wireless LAN switching interval Ts is an interval of timings for switching the wireless LAN connection, and also an interval between one switching of the wireless LAN connection and next switching of the wireless LAN connection. For example, when the number Na of wireless LAN switching times is "3", the estimation unit 62 estimates an interval Ts1 between the first switching of the wireless LAN connection and the second switching of the wireless LAN connection, and, estimates an interval Ts2 between the second switching of the wireless LAN connection and the third switching of the wireless LAN connection. The wireless LAN switching frequency Fs can be expressed by, for example, "Na*Ta/Tk", when the unit time is "Tk".

Communication Control Unit 63

The communication control unit 63 restricts the wireless LAN connection in the wireless LAN communication unit 50, on the basis of the wireless LAN switching state estimated by the estimation unit 62. For example, when the number Na of wireless LAN switching times estimated by the estimation unit 62 is equal to or greater than a threshold value Nth, the communication control unit 63 restricts the wireless LAN connection in the wireless LAN communication unit 50 not to perform wireless LAN connection in the wireless LAN communication unit 50.

When the wireless LAN connection in the wireless LAN communication unit 50 is restricted, the communication control unit 63 does not perform automatic connection for the wireless LAN access point 2. The communication control unit 63 accesses a server from the wireless WAN communication unit 51 through the information providing apparatus 4, in response to an access instruction for a server (for example, a Web server) connected to the communication network 7 in accordance with an operation (hereinafter referred to as a user operation) onto the display unit 52 or the operation unit 53 by the user U.

When the wireless LAN connection in the wireless LAN communication unit 50 is not restricted, the communication control unit 63 performs automatic connection for the wireless LAN access point 2. Thus, the communication control unit 63 accesses a server using the wireless LAN communication unit 50 as priority, in response to an access instruction for a server connected to the communication network 7 in accordance with a user operation. That is, when a connection is made to the wireless LAN access point 2, the communication control unit 63 accesses a server from the wireless LAN communication unit 50 through the information providing apparatus 4. On the contrary, when a connection is not made to the wireless LAN access point 2, the unit accesses to a server from the wireless WAN communication unit 51 through the information providing apparatus 4.

The communication control unit 63 determines whether to perform a process (hereinafter referred to as a restriction determination process) for determining whether to restrict the wireless LAN connection in the wireless LAN communication unit 50 at a period corresponding to the moving speed Va of the user U. For example, the communication control unit 63 performs a restriction determination process at a period Tc (=Tb*Va) which is obtained by multiplying a basic period Tb by the average moving speed Vav (=ΣVa/Tb) of the user U.

Accordingly, the communication control unit 63 performs the restriction determination process at a timing on the basis of the average moving speed Vav of the user U. When the user U continues to be in a stopped state during movement, the unit does not perform the restriction determination process, thus lowering a process load on the control unit 56. On the basis of the setting in accordance with a user operation, "Ta=Tc" may be set, or "Ta>Tc" may also be set.

Instead of performing the restriction determination process at the period Tc, the communication control unit 63 may perform the restriction determination process every time a change in the current value detected by the position detection unit 55 exceeds a predetermined value. Accordingly, the average moving speed Vav may not necessarily be performed.

The communication control unit 63 may also perform the restriction determination process, when a movement history of the user U does not satisfy a predefined condition, for example, when the user U suddenly changes the moving direction in the moving area 8. This enables to improve the connection stability of the wireless communication in the wireless communication terminal 5.

The communication control unit 63 may restrict the wireless LAN connection in the wireless LAN communication unit 50 not to perform the wireless LAN connection in the wireless LAN communication unit 50, on the basis of the wireless LAN switching interval Ts estimated by the estimation unit 62 or the distribution of the wireless LAN switching intervals Ts. For example, when a percentage of relatively short wireless LAN switching intervals Ts is equal to or greater than a threshold value, the communication control unit 63 may restrict the wireless LAN connection in the wireless LAN communication unit 50. When, the number of wireless LAN switching intervals Ts equal to or greater than a threshold value, is equal to or greater than a predetermined number, the communication control unit 63 can also restrict the wireless LAN connection in the wireless LAN communication unit 50. When the minimum value of the wireless LAN switching intervals Ts is equal to or greater than a predetermined threshold value, the communication control unit 63 restricts the wireless LAN connection in the wireless LAN communication unit 50.

The communication control unit 63 can restrict the wireless LAN connection in the wireless LAN communication unit 50 not to perform the wireless LAN connection in the wireless LAN communication unit 50, on the basis of the wireless LAN switching frequency Fs estimated, by the estimation unit 62. For example, the communication control unit 63 restricts the wireless LAN connection in the wireless LAN communication unit 50, when the wireless LAN switching frequency Fs is equal to or greater than a predetermined threshold value.

The prediction unit 61 and the estimation unit 62 perform the processes before and at the same rate with the restriction determination process of the communication control unit 53. The prediction unit 61 may predict the moving area 8 at a predetermined interval Td (<<Tc), while the estimation unit 62 may estimate the number Na of wireless LAN switching times at a predetermined interval Tc (<<Tc). This enables to immediately start the restriction determination process of the communication control unit 63.

Setting Unit 64

The setting unit 64 can change various setting values of the wireless LAN communication control application in accordance with a user operation. For example, the setting unit 64 can change the above-described coefficients Kd1, Kd2, Kang, Ka, and Kb, in accordance with the user operation.

1.3. Process Flow of Wireless Communication Terminal 5

Figure 9:
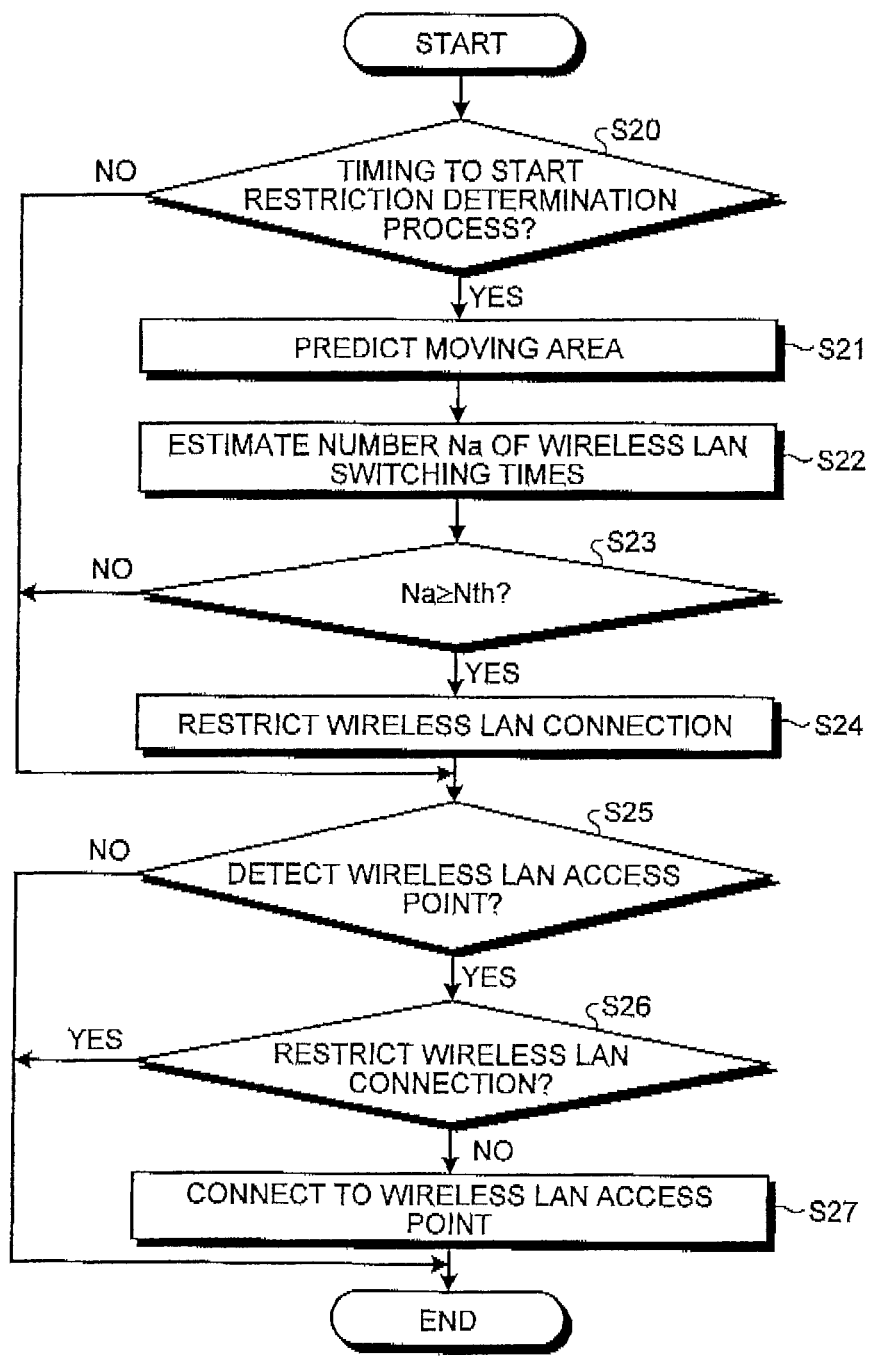
FIG. 9 is a flowchart of an information process in, a wireless communication terminal.

Descriptions will now be made to an information process of the wireless communication terminal 5 according to the first embodiment, with reference to FIG. 9. FIG. 9 is a flowchart of the information process in the wireless communication terminal 5. The information process illustrated in FIG. 9 is repeatedly performed by the control unit 56 of the wireless communication terminal 5. Descriptions will now be made to the number Na of wireless LAN switching times by way of example, as a wireless LAN switching state.

As illustrated in FIG. 9, the control unit 56 determines whether it is the timing to start the restriction determination process (Step S20). When the unit determines that it is the timing to start the restriction determination process (Step S20; Yes), the control unit 56 predicts the moving area 8 (step S21). The control unit 56 estimates the number Na of wireless LAN switching times in the moving area 8 (Step S22), and determines whether the estimated number Na of wireless LAN switching times is equal to or greater than the threshold value Nth (Step S23).

When it is determined that the number Na of wireless LAN switching times is equal to or greater than the threshold value Nth (Step S23; Yes), the control unit 56 restricts the wireless LAN connection (step S24). The control unit 56 sets a wireless LAN restriction flag stored in the storage unit 54 to, for example, "1".

When the unit determines that it is not the timing to start the restriction determination process (Step S20; No), when the unit determines that the number Na of wireless LAN switching times is not equal to or greater than the threshold value Nth (Step S23; No), or when the procedure of Step S24 is ended, the control unit 56 shifts to Step S25.

In Step S25, the control unit 56 determines whether the wireless LAN access point 2 has been detected. The control unit 56 determines that the wireless LAN access point 2 has been detected, when a beacon sent from the wireless LAN access point 2 is received by the wireless LAN communication unit 50, or when a probe response is received in response to a probe request sent from the wireless LAN communication unit 50.

Even when the wireless LAN access point 2 has been detected, the control unit 56 can determine that the wireless LAN access point 2 has not been detected, as long as no automatic connection is set at the detected wireless LAN access point 2.

In Step S25 when it is determined that the wireless LAN access point 2 has been detected (Step S25; Yes), the control unit 56 determines whether the wireless LAN connection is restricted by the process of Step S24 (Step S26). For example, when the wireless LAN restriction flag stored in the storage unit 54 is set to "1", the control unit 56 determines that the wireless LAN connection has been restricted. When the wireless LAN restriction flag is set to "0", the control unit 56 determines that the wireless LAN connection has not been restricted.

When determined that the wireless LAN connection has not been restricted (Step S26; No), the control unit 56 performs a wireless LAN connection for the detected wireless LAN access point 2 as determined in Step S25 (Step S27).

When it is determined that the wireless LAN access point 2 has not been detected (Step S25; No), when determined that the wireless LAN connection has been restricted (Step S26; Yes), or when the procedure of Step S27 is ended, the control unit 56 ends the information process illustrated in FIG. 9.

When there is generated an access instruction for a server connected to the communication network 7 in accordance with a user operation, if a wireless LAN connection is made with the wireless LAN access point 2, the control unit 56 accesses the server from the wireless LAN communication unit 50 through the wireless LAN access point 2. On the contrary, if the wireless LAN connection is not made with the wireless LAN access point 2, the unit accesses the server from the wireless WAN communication unit 51 through the wireless WAN base station 3.

Accordingly, the wireless communication terminal 5 of the wireless communication system 1 according to the first embodiment estimates the switching state of the wireless LAN connection in the wireless LAN communication unit 50, on the basis of the wireless LAN communication environment in the predicted moving area 8 of the user U, and restricts the wireless LAN connection in the wireless LAN communication unit 50, on the basis of the estimated switching state. As a result, it is possible to prevent a frequent occurrence of the connection and disconnection between the wireless communication terminal 5 and the wireless LAN access point 2, and to prevent a decrease in the connection stability of the wireless communication in the wireless communication terminal 5.

The wireless LAN connection service by the wireless LAN access point 2 may be provided by a plurality of wireless LAN service providers. In this case, there may exist the wireless LAN access point 2 of different wireless LAN connection services in the moving area 8. In this situation, the control unit 56 of the wireless communication terminal 5 estimates the number Na of wireless LAN switching times in the moving area 8 in the unit of wireless LAN connection service, for example. When there is a wireless LAN connection service with a number Na of wireless LAN switching times lower than the threshold value Nth, the control unit 56 makes a wireless LAN connection with the wireless LAN access point 2 corresponding to this wireless LAN connection service.

Figure 11:
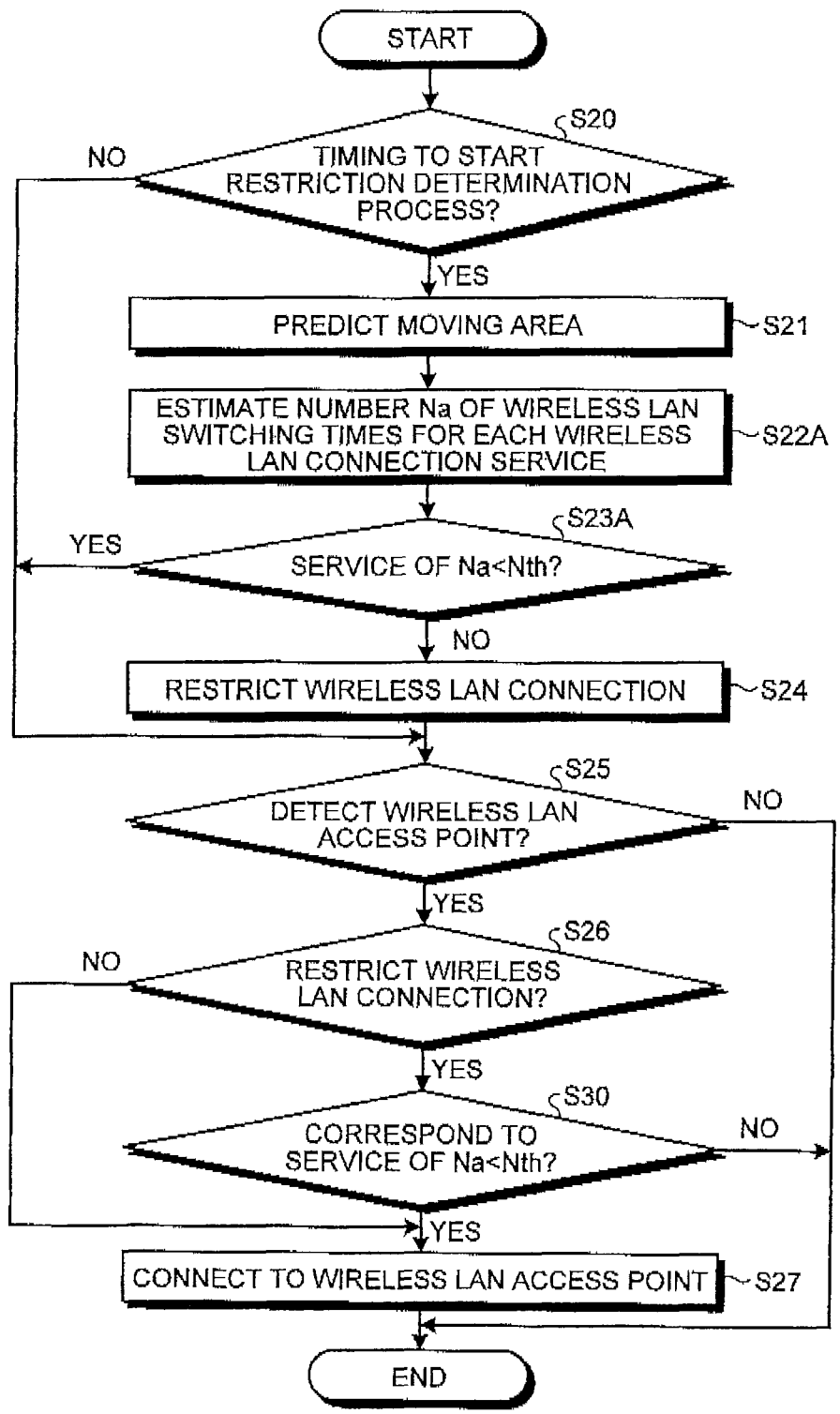
FIG. 11 is a flowchart of an information process in the wireless communication terminal.

Descriptions will further specifically be made to an example of a process when there are a plurality of wireless LAN connection services. FIG. 10 is a diagram illustrating an example of an AP information table stored in the DB 42 of the information providing apparatus 4. FIG. 11 is a flowchart of an information process performed by the control unit 56 of the wireless communication terminal 5.

The AP information table illustrated in FIG. 10 stores information regarding wireless LAN service providers in association with AP-IDs. When an information transmission request is sent from the wireless communication terminal 5 through the communication unit 41, the control unit 43 of the information providing apparatus 4 sends information regarding the installation position, the wireless LAN communication area, and the wireless LAN service provider, as information about the wireless LAN access point 2, to the wireless communication terminal 5 as a request source.

The control unit 56 determines whether to connect to the wireless LAN access point 2 in the unit of wireless LAN connection service, on the basis of the information regarding the wireless LAN access point 2, which is acquired from the information providing apparatus 4. Specifically, as illustrated in FIG. 11, it obtains the number Na of wireless LAN switching times in the unit of wireless LAN connection service (Step S22A), and determines whether there is a wireless LAN connection service with the number Na of wireless LAN switching times lower than the threshold value Nth (Step S23A).

When it is determined that there is no wireless LAN connection service with the number Na of wireless LAN switching times lower than the threshold value Nth (Step S23A; No), the control unit 56 restricts the wireless LAN connection (Step S24). Procedures of Steps S20 and S21 illustrated in FIG. 11 are the same as those procedures of Steps S20 and S21 illustrated in FIG. 9.

When it is determined that the wireless LAN connection is restricted (Step S26; Yes), the control unit 55 determines whether the wireless LAN access point 2 detected in Step S25 is a wireless LAN access point 2 corresponding to the wireless LAN connection service with the number Na of wireless LAN switching times lower than the threshold value Nth (Step S30). It is possible to also change the threshold value Nth for each wireless LAN connection service.

In the procedure of Step S30, the control unit 56 can determine to which wireless LAN connection service the wireless LAN access point 2 corresponds, on the basis of, for example, an ESSID (Extended Service Set Identifier) included in a wireless signal (for example, a beacon or a probe response) sent from the wireless LAN access point 2. Information regarding the ESSID is included, for example, in information regarding the wireless LAN service provider, sent from the information providing apparatus 4. The control unit 56 compares information from the wireless LAN access point 2 and information from the information providing apparatus 4, thereby determining to which wireless LAN connection service the wireless LAN access point 2 corresponds.

When it is determined that the wireless LAN access point 2 corresponds to the wireless LAN connection service with the number Na of wireless LAN switching times lower than the threshold value Nth (Step S30: Yes), or when it is determined that the wireless LAN connection is not restricted (Step S26; No), the control unit 56 executes the procedure of Step S27. In the procedure of Step S27, the wireless LAN access point 2 with the wireless LAN connection is one corresponding to one of a plurality of wireless LAN service providers. The procedures of the Steps S25, S25, and S27 illustrated in FIG. 11 are the same as those procedures of Steps S25, S26, and S27 illustrated in FIG. 9.

When it is determined that the wireless LAN access point 2 does not correspond to the wireless LAN connection service with the number Na of wireless LAN switching times lower than the threshold value Nth (Step S30; No), the control unit 56 ends the information process illustrated in FIG. 11.

Accordingly, the wireless communication terminal 5 estimates the number Na of wireless LAN switching times in the moving area 8 in the unit of wireless LAN connection service, and can restrict the wireless LAN connection on the basis of this number Na of wireless LAN switching times. Thus, even if an automatic connection is set in the wireless communication terminal 5 for a plurality of wireless LAN connection services, it is possible to improve the connection stability of the wireless communication.

When roaming is set for the wireless LAN access point 2 corresponding to the same wireless LAN connection service, and when the wireless communication terminal 5 has a roaming function, the control unit 56 can obtain the number Na of wireless LAN switching times, while the wireless LAN communication areas 6 of the plurality of wireless LAN access points 2 corresponding to the same wireless LAN connection service are assumed as one wireless LAN communication area. In this case, the control unit 56 can obtain the number Na of wireless LAN switching times, on the basis of the wireless LAN communication areas 6 of the wireless LAN access points 2 corresponding to the plurality of wireless LAN connection services.

2. Second Embodiment

In the wireless communication system 1 according to the first embodiment, the wireless LAN connection between the wireless communication terminal 5 and the wireless LAN access point 2 is controlled using the function of the wireless communication terminal 5. However, in the second embodiment, a wireless LAN connection between the wireless communication terminal 5 and the wireless LAN access point 2 is controlled using the function of the wireless LAN access point 2 and the information providing apparatus 4. The same elements as those of the wireless communication system 1 according to the first embodiment are identified with the same reference numerals, and thus will not be repeatedly described hereinafter again.

FIG. 12 is a diagram illustrating a configuration of a wireless communication system according to the second embodiment. As illustrated in FIG. 12, a wireless communication system 1A according to the second embodiment includes wireless LAN access point 2, a wireless WAN base station 3, an information providing apparatus 4A, and a wireless communication terminal 5A.

The wireless communication terminal 5A has a wireless LAN communication unit 50, a wireless WAN communication unit 51, a display unit 52, an operation unit 53, a storage unit 54, a position detection unit 55, and a control unit 56A. The control unit 56A sends current location information of the wireless communication terminal 5A which is detected by the position detection unit 55 to the information providing apparatus 4A through the wireless LAN communication unit 50 or the wireless WAN communication unit 51.

The control unit 56A determines a movement distance of a user U on the basis of a change in the current location of the wireless communication terminal 5A which is detected by the position detection unit 55, and can send the current location information of the wireless communication terminal 5A to the information providing apparatus 4A, when the user U moves a predetermined distance. The control unit 56A sends identification information (hereinafter referred to as a terminal ID) of the wireless communication terminal 5A together with the current location information. The terminal ID is a MAC address (Media Access Control address) of the wireless LAN communication unit 50.

Upon detection of the wireless LAN access point 2, the control unit 56A tries a wireless LAN connection for the wireless LAN access point 2. When the wireless LAN connection is completely made for the wireless LAN access point 2, the unit performs communication with a server connected to a communication network 7 through the wireless LAN access point 2. When the wireless LAN connection is not possibly made for the wireless LAN access point 2, the unit performs communication with a server connected to the communication network 7 through the wireless WAN communication unit 51.

The information providing apparatus 4A includes a communication unit 41, a DB 42, and a control unit 43A. The control unit 43A includes an acquisition unit 60A, a prediction unit 61A, an estimation unit 62A, and a communication control unit 63A.

The acquisition unit 60A acquires current location information and a terminal ID sent from the wireless communication terminal 5A through the communication unit 41, and stores them in the DB 42. Like the prediction unit 61, the prediction unit 61A predicts, as a moving area 8, a possible area where the user U of the wireless communication terminal 5A moves in a predetermined period of time Ta, in association with each wireless communication terminal 5A, on the basis of the current location information and the terminal ID stored in the DB 42.

The estimation unit 62A estimates a wireless LAN switching state, on the basis of information regarding the wireless LAN access point 2 existing in the moving area 8, in association with each wireless communication terminal 5A. This process is the same as that of the estimation unit 62.

The communication control unit 63A restricts the wireless LAN connection for the wireless LAN access point 2 of the wireless communication terminal 5A, on the basis of the wireless LAN switching state estimated by the estimation unit 62A, in association with each wireless communication terminal 5A. For example, the communication control unit 63A determines whether the number Na of wireless LAN switching times is equal to or smaller than a threshold value Nth. Then, the communication control unit 63A informs the wireless LAN access point 2 existing around the current location of the wireless communication terminal 5A, about a terminal ID of the wireless communication terminal 5A with the number Na of wireless LAN switching times equal to or lower than the threshold value Nth, as a connection refused terminal ID.

The wireless LAN access point 2 does not perform the wireless LAN connection, when a wireless LAN connection is requested by the wireless communication terminal 5A having the connection refused terminal ID, as informed by the information providing apparatus 4. For example, when a probe request is sent from the wireless communication terminal 5A having the connection refused terminal ID, the wireless LAN access point 2 does not perform a probe response. For example, when an association request is sent from the wireless communication terminal 5A having the connection refused terminal ID, in response to a sent beacon, the wireless LAN access point 2 does not perform an association response.

FIG. 13 is a flowchart of an information process by the information providing apparatus 4A. This information process is repeatedly performed by the control unit 43A of the information providing apparatus 4A.

As illustrated in FIG. 13, the control unit 43A of the information providing apparatus 4A determines whether current location information has been acquired from the wireless communication terminal 5A (Step S40). When it is determined that the current location information has been acquired from the wireless communication terminal 5A (Step S40; Yes), the control unit 43A stores the current location information in the DB 42 (step S41). The current location information from the wireless communication terminal 5A includes information regarding the current location and a terminal ID. The control unit 43A stores the information regarding the current location and the terminal ID in the DB 42.

Upon completion of a procedure of Step S41, the control unit 43A determines that it is the timing to start a restriction determination process (Step S42). The procedure of Step S42 is the same as the procedure of Step S20. When it is determined that it is the timing to start the restriction determination process (Step S42; Yes), the control unit 43A predicts the moving area 8 (Step S43). The control unit 43A estimates the number Na of wireless LAN switching times in the moving area 8 (Step S44), and determines whether the estimated number Na of wireless LAN switching times is equal to or greater than the threshold value Nth (Step S45).

When it is determined that the number Na of wireless LAN switching times is equal to or greater than the threshold value Nth (Step S45; Yes), the control unit 43A sets a restriction on the wireless LAN connection for the wireless communication terminal 5A corresponding to the sent current location information, as determined in step S40 (Step S46). For example, the control unit 56A sets, to "1", a wireless LAN restriction flag of the wireless communication terminal 5A, of wireless LAN restriction flags of the wireless communication terminals 5A which are stored in the DB 42. This enables the restriction setting of the wireless LAN connection.

Upon completion of the procedure of Step S46, the control unit 43A sends a terminal ID of the wireless communication terminal 5A with the set restriction, as a connection refused terminal ID, to the wireless LAN access point 2 (Step S47). The wireless LAN access point 2, as a destination of the connection refused terminal ID, is a wireless LAN access point 2, for example, having the wireless LAN communication area 6 with the current location of the wireless communication terminal 5A corresponding to the connection refused terminal ID, or is its surrounding wireless LAN access point 2.

When it is determined that the current location information has not been acquired, from the wireless communication terminal 5A (Step S40; No), when it is determined that it is not the timing to start the restriction determination process (Step S42; No), when the number Na of wireless LAN switching times is not equal to or greater than the threshold value Nth (Step S45; No), or when the procedure of Step S47 is completed, the control unit 43A ends the information process illustrated in FIG. 13.

Accordingly, in the wireless communication system 1A according to the second embodiment, the information providing apparatus 4A is aware of the current location of the wireless communication terminal 5A, and the request for the wireless LAN connection sent from the wireless communication, terminal 5A is not responded in the wireless LAN access point 2. This enables to lower a process load on the wireless communication terminal 5A, as compared to the wireless communication system 1 according to the first embodiment.

The information providing apparatus 4A performs the above-described process only for the wireless communication terminal 5A which has sent the restriction process setting request, but may perform the above process also for the wireless communication terminal 5A which has not sent the restriction process setting request. The restriction process setting request is sent from the wireless communication terminal 5A in accordance with a user operation of the wireless communication terminal 5A.

The descriptions have been made under the assumption that the current location information of the wireless communication terminal 5A is sent from the wireless communication terminal 5A. However, the information providing apparatus 4A may detect the current location of the wireless communication terminal 5A, on the basis of a detection result of the wireless communication terminal 5A in the wireless WAN base station 3 or the wireless LAN access point 2.

3. Modification

In the above-described embodiments, the moving area 8 has been predicted on the basis of a change in the current location of the wireless communication terminal 5 (5A). However, the moving area 8 may be predicted in accordance with any other method. For example, the load (way) on the guided route may be set as the predicted area, when the destination is set in the wireless communication terminal 5 (5A) on which a route guiding function for the destination is operated.

The control unit 56 of the wireless communication terminal 5 may detect the communication traffic with the server connected to the communication network 7, and change the threshold value Nth on the basis of the communication traffic. For example, when the communication traffic is very small, the threshold value Nth is increased, and when the communication is very large, the threshold value Nth is decreased.

As a result, for example, when video content is viewed, the threshold value Nth is decreased, and at the page browsing for a blog or news, the threshold value Nth can be increased. This enables to lower an effect in the communication with the server and increase an opportunity to communicate through the wireless LAN connection.

The control unit 56A of the wireless communication terminal 5A detects the communication traffic with the server connected to the communication network 7, and informs the information providing apparatus 4A of the detection. The control unit 43A of the information providing apparatus 4A can change the threshold value Nth on the basis of the communication traffic.

Like the case of the number Na of wireless LAN switching times, the control unit 56A of the wireless communication terminal 5A can change the threshold value for the number Ts of wireless LAN switching intervals Ts or the threshold value for the wireless LAN switching frequency Ts, on the basis of the communication traffic.

In the above embodiments, examples of the wireless LAN communication state estimated by the estimation unit 62 are the number of wireless LAN communication switching times, the wireless LAN switching intervals, and the wireless LAN switching frequency. However, the wireless LAN communication state may be estimated with a combination of the examples. In this case, the communication control unit 63 can restrict the wireless LAN connection in the wireless LAN communication unit 50, on the basis of the number of wireless LAN communication switching times, the wireless LAN switching intervals, and the wireless LAN switching frequency.

4. Effect

As described above, the wireless communication terminal 5 according to the embodiment has the prediction unit 61, the estimation unit 62, and the communication control unit 63. The prediction unit 61 predicts the moving area 8 of the user U. The estimation unit 62 estimates the switching state of the wireless LAN connection in the wireless LAN communication unit 50, on the basis of the wireless LAN communication environment in the moving area 8 predicted by the prediction unit 61. The communication control unit 63 restricts the wireless LAN connection, in the wireless LAN communication unit 50, on the basis of the switching state estimated by the estimation unit 62.

According to this Configuration, it is possible to prevent a frequent occurrence of connection and disconnection between the wireless communication terminal 5 and the wireless LAN access point 2, and to prevent a remarkable decrease in the connection stability of the wireless communication in the wireless communication terminal 5.

When the restriction is not made on the wireless LAN connection in the wireless LAN communication unit 50, the communication control unit 63 communicates with a server (an example of an apparatus connected to an external network) connected to the communication network 7 using the wireless LAN communication unit 50. When the restriction is made on the wireless LAN connection in the wireless LAN communication unit 50, the unit communicates with a server connected to the communication network 7 using the wireless WAN communication unit 51.

According to this configuration, even if a restriction is made on the wireless LAN connection, the wireless communication terminal 5 can access the server connected to the communication network 7, through the communication connection with the wireless WAN base station 3 using the wireless WAN communication.

The prediction unit 61 changes the size of the moving area 8 to be predicted, in, accordance with the moving speed Va of the user U.

According to this configuration, it is possible to prevent a decrease in the connection stability of the wireless communication in the wireless communication terminal 5 with high accuracy.

The prediction unit 61 predicts the fan-shaped area, spreading out toward the forward direction of the user U, as the moving area 8.

According to this configuration, it is possible to prevent a decrease in the connection stability of the wireless communication in the wireless communication terminal 5 with high accuracy.

The estimation unit 62 estimates the switching state of the wireless LAN connection in the wireless LAN communication unit 50, on the basis of the number of wireless LAN access points 2 existing in the moving area 8.

According to this configuration, it is possible to easily estimate the switching state of the wireless LAN connection, and thus reducing the load in the estimation process.

The estimation unit 62 estimates the switching state of the wireless LAN connection in the wireless LAN communication unit 50, on the basis of the number and shapes of areas, which are not the wireless LAN communication area 6 of the wireless LAN access point 2 in the moving area 8.

According to this configuration, it is possible to estimate the switching state of the wireless LAN connection with high accuracy.

The wireless communication system 1 (1A) according to the embodiment includes the prediction unit 61 (61A), the estimation unit 62 (62A), and the communication control unit 63 (63A). The prediction unit 61 (61A) predicts the moving area 8 of the user U of the wireless communication terminal 5 (5A). The estimation unit 62 (62A) estimates the switching state of the wireless LAN connection in the wireless LAN communication unit 50 of the wireless communication terminal 5 (5A), on the basis of the wireless LAN communication environment in the wireless LAN communication unit 50 of the wireless communication terminal 5 (5A). The communication control unit 63 (63A) restricts the wireless LAN connection in the wireless LAN communication unit 50, on the basis of the switching state estimated by the estimation, unit 62 (62A).

According to this configuration, it is possible to prevent a frequent occurrence of connection and disconnection between the wireless communication terminal 5 (5A) and the wireless LAN access point 2, and to prevent a remarkable decrease in the connection stability of the wireless communication in the wireless communication terminal 5 (5A).

The above-described information providing apparatus 4 may be realized by a plurality of server computers, and its configuration may flexibly be changed. For example, some function may be realized by calling the external platform by an ATP (Application Programming Interface) or network computing.

The wireless communication terminal, the wireless communication method, and the wireless communication system according to the present disclosure have an effect of improving the connection stability of wireless communication in the wireless communication terminals.

Although the invention has been described with respect to specific embodiments for a complete and clear disclosure, the appended claims are not to be thus limited but are to be construed as embodying all modifications and alternative constructions that may occur to one skilled in the at that fairly fall within the basic teaching herein set forth.

What is claimed is:

1. A wireless communication terminal comprising:
a wireless LAN communication unit;
a prediction unit configured to predict an area to which a user of the wireless communication terminal may move;
an estimation unit configured to estimate a switching state of a wireless LAN connection in the wireless LAN communication unit, on the basis of a wireless LAN communication environment in the area predicted by the prediction unit; and
a communication control unit configured to restrict the wireless LAN connection in the wireless LAN communication unit in the area predicted by the prediction unit, on the basis of the switching state estimated by the estimation unit.

2. The wireless communication terminal according to claim 1, further comprising:
a wireless WAN communication unit, and wherein
the communication control unit performs communication with an apparatus connected to an external network by the wireless LAN communication unit, when the restriction is not made on the wireless LAN connection in the wireless LAN communication unit, and performs communication with an apparatus connected to an external network by the wireless WAN communication unit, when the restriction is made on the wireless LAN connection in the wireless LAN communication unit.

3. The wireless communication terminal according to claim 1, wherein
the prediction unit changes a size of the area to be predicted in accordance with a moving speed of the user.

4. The wireless communication terminal according to claim 1, wherein
the prediction unit predicts a fan-shaped area spreading out toward a forward direction of the user, as the area.

5. The wireless communication terminal according to claim 1, wherein
the estimation unit estimates the switching state of the wireless LAN connection in the wireless LAN communication unit, on the basis of a number of wireless LAN access points existing in the area predicted by the prediction unit.

6. The wireless communication terminal according to claim 1, wherein
the estimation unit estimates the switching state of the wireless LAN connection in the wireless LAN communication unit, on the basis of a number and shapes of areas, which are not wireless LAN communication areas of the wireless LAN access point in the area predicted by the prediction unit.

7. The wireless communication terminal according to claim 1, wherein
the estimation unit estimates the switching state of the wireless LAN connection in the wireless LAN communication unit, on the basis of a wireless LAN switching frequency or a wireless LAN switching interval in the area predicted by the prediction unit.

8. A non-transitory computer readable storage medium containing program instructions for controlling a wireless connection, wherein execution of the program instructions by one or more processors of a computer system causes the one or more processors to perform:
predicting an area to which a user of the computer system may move;

estimating a switching state of a wireless LAN connection in a wireless LAN communication unit of the computer system, on the basis of a wireless LAN communication environment in the predicted area; and restricting the wireless LAN connection in the wireless LAN communication unit in the predicted area, on the basis of the estimated switching state.

9. A wireless communication method performed by a computer, comprising:

predicting an area to which a user of the computer may move;

estimating a switching state of a wireless LAN connection in a wireless LAN communication unit of the computer, on the basis of a wireless LAN communication environment in the predicted area; and restricting the wireless LAN connection in the wireless LAN communication unit in the predicted area, on the basis of the estimated switching state.

10. The wireless communication method according to claim 9, further comprising:

performing communication with an apparatus connected to an external network by the wireless LAN communication unit, when the restriction is not made on the wireless LAN connection in the wireless LAN communication unit; and performing communication with an apparatus connected to an external network by a wireless WAN communication unit of the computer, when the restriction is made on the wireless LAN connection in the wireless LAN communication unit.

11. The wireless communication method according to claim 9, wherein the predicting includes changing a size of the predicted area in accordance with a moving speed of the user.

12. The wireless communication method according to claim 9, wherein the predicting includes predicting a fan-shaped area spreading out toward a forward direction of the user, as the predicted area.

13. The wireless communication method according to claim 9, wherein the estimating includes estimating the switching state of the wireless LAN connection in the wireless LAN communication unit, on the basis of a number of wireless LAN access points existing in the predicted area.

14. The wireless communication method according to claim 9, wherein the estimating includes estimating the switching state of the wireless LAN connection in the wireless LAN communication unit, on the basis of a number and shapes of areas, which are not wireless LAN communication areas of the wireless LAN access point in the predicted area.

15. A communication system including a wireless communication terminal having a wireless LAN communication unit, the system comprising:

a prediction unit configured to predict an area to which a user of the wireless communication terminal may move;

an estimation unit configured to estimate a switching state of a wireless LAN connection in the wireless LAN communication unit, on the basis of a wireless LAN communication environment in the area predicted by the prediction unit; and a communication control unit configured to restrict the wireless LAN connection in the wireless LAN communication unit in the area predicted by the prediction unit, on the basis of the switching state estimated by the estimation unit.

* * * * *